W. A. BLAKESLEE.
VALVE.
APPLICATION FILED APR. 26, 1915.
1,175,690.
Patented Mar. 14, 1916.
Fig. 1.
Fig. 2.
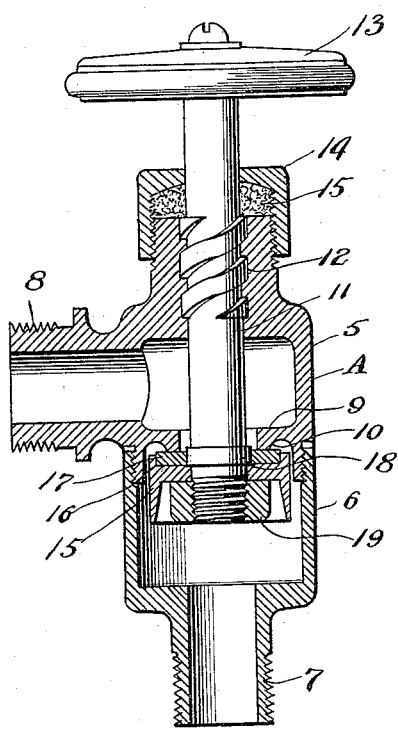
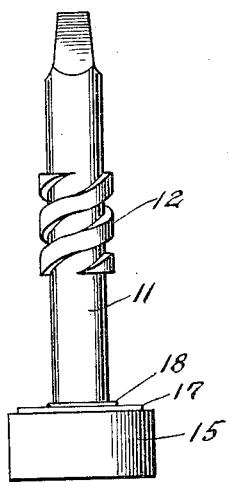
Witnesses
Inventor
W. A. Blakeslee.
By Victor J. Evans
Attorney

UNITED STATES PATENT OFFICE.

WILLIAM A. BLAKESLEE, OF WESTFIELD, MASSACHUSETTS.

VALVE.

1,175,690.　　　　　Specification of Letters Patent.　　Patented Mar. 14, 1916.

Application filed April 26, 1915.　Serial No. 23,920.

*To all whom it may concern:*

Be it known that I, WILLIAM A. BLAKESLEE, a citizen of the United States, residing at Westfield, in the county of Hampden and State of Massachusetts, have invented new and useful Improvements in Valves, of which the following is a specification.

The invention relates to valves, and more particularly to the class of self-closing valves.

The primary object of the invention is the provision of a valve which is designed to use in sink bibs, basin cocks, bath cocks, flush tanks, ball cocks, or the like, and automatically closes under the action of pressure so as to shut off the water supply.

Another object of the invention is the provision of a valve of this character wherein the construction thereof is of novel form to assure positiveness in action and to automatically close under fluid pressure for controlling the supply of fluid.

A further object of the invention is the provision of a valve of this character which is extremely simple in construction, thoroughly reliable and efficient in operation, strong, durable, and inexpensive in manufacture.

With these and other objects in view, the invention consists in the construction, combination and arrangement of parts as will be hereinafter fully described, illustrated in the accompanying drawing, and pointed out in the claim hereunto appended.

In the drawing:—Figure 1 is a vertical longitudinal sectional view through a faucet showing the valve constructed in accordance with the invention therein. Fig. 2 is a side elevation of the valve and stem.

Similar reference characters indicate corresponding parts throughout the several views in the drawing.

Referring to the drawing in detail, A designates the body of a faucet comprising the separable sections 5 and 6, the latter being formed with an externally threaded nipple 7 for the coupling thereof to a water supply pipe, and this nipple forms the inlet to the faucet, while the section 5 is provided with an externally threaded nipple 8 for the fastening of a delivery spout thereto, the said nipple being designed as the outlet for the water.

Formed within the section 5 of the body is a perforated partition 9 having thereon concentrically of the perforation therein a bead 10 forming a valve seat, and threaded in the section 5 centrally thereof is a valve stem 11, the same being provided with a double rapid feed thread 12, while secured to the outer end of the stem without the faucet is a hand wheel 13 so that it can be manually turned.

Threaded on the upper end of the section 5 of the faucet is a cap 14 having arranged therein a packing 15 which, together with the said cap, serves as a packing for the stem 11 as usual.

Mounted on the inner end of the stem 11 is an inverted substantially cup-shaped valve 15 formed with a seat 16 receiving a gasket 17 which is adapted to contact with the valve seat 10 for closing the aperture therein, and thereby shutting off the water supply.

The valve 15 is engaged against an annular shoulder 18 formed on the valve stem 11, and is held against the same through the medium of a lock nut 19 threaded on the stem, the said nut being provided with left hand threads.

When the valve 15 has been manually opened and the wheel 13 released by the hand of the operator, the pressure of the water against the cup-shaped valve 15 will automatically cause the rapid displacement of the stem 11 by reason of the particular double feed thread 12, which allows the rapid turning of the stem 11 with the least resistance to the pressure of the water against the valve 15, and thereby the latter will automatically close for shutting off the water supply through the faucet. The valve 15 is opened by manually turning the stem 11 through the instrumentality of the wheel 13 on the outer end thereof without the faucet.

From the foregoing description, taken in connection with the accompanying drawing, the construction and manner of operation of the device will be clearly understood, and therefore a more extended explanation has been omitted.

What is claimed is:—

A valve structure comprising a faucet body formed from separable sections, one of said sections being provided with a perforated partition to provide superposed chambers therein, a bead on the partition concentrically of the perforation therein to form a valve seat, a stem having a double rapid feed thread engaged in one of said sections, an inverted substantially cup shaped valve mounted on the inner end of the stem and having a seat, a gasket engaged in the seat in the valve and adapted to contact with the seat concentrically of the perforation in the partition, a shoulder formed on the valve stem to provide an abutment for the valve, and a lock nut threaded on the valve stem and working against the valve, the said valve being located in the lowermost chamber in the faucet body while the valve stem projects through the uppermost chamber therein and the perforation in the partition.

In testimony whereof I affix my signature in presence of two witnesses.

WILLIAM A. BLAKESLEE.

Witnesses:
ADDIE B. LEWIS,
W. EDWARD PIKE.

Copies of this patent may be obtained for five cents each, by addressing the "Commissioner of Patents, Washington, D. C."